United States Patent [19]

Orlowski et al.

[11] Patent Number: 5,174,583
[45] Date of Patent: Dec. 29, 1992

[54] UNITARY BEARING SEAL

[76] Inventors: David C. Orlowski, 2901 106th Ave. West, Milan, Ill. 61264; Niel F. Hoehle, 14314 139th Avenue Ct. West, Taylor Ridge, Ill. 61284

[21] Appl. No.: 742,317

[22] Filed: Aug. 8, 1991

[51] Int. Cl.⁵ .............................. F16J 15/447
[52] U.S. Cl. ..................... 277/56; 277/53; 277/67; 277/214; 277/215; 277/35
[58] Field of Search ............ 277/53, 54, 55, 56, 277/67, 68, 25, 214, 215, 35, 133, 96.2

[56] References Cited

U.S. PATENT DOCUMENTS

| | | | |
|---|---|---|---|
| 3,343,891 | 9/1967 | Shipman | 277/55 |
| 3,469,851 | 9/1969 | Enemark | 277/96.2 X |
| 3,968,969 | 7/1976 | Mayer et al. | 277/67 X |
| 4,022,479 | 5/1977 | Orlowski | 277/53 |
| 4,114,902 | 9/1978 | Orlowski | 277/53 |
| 4,416,458 | 11/1983 | Takenaka et al. | 277/96.2 X |
| 4,522,410 | 6/1985 | Hölzer | 277/56 |
| 4,572,517 | 2/1986 | Rockwood et al. | 277/53 |
| 4,576,383 | 3/1986 | Ballard | 277/53 |
| 4,580,790 | 4/1986 | Doose | 277/96.2 X |
| 4,630,458 | 12/1986 | Kakabaker | 277/56 X |
| 4,706,968 | 11/1987 | Orlowski | 277/24 X |
| 4,890,941 | 1/1990 | Calafell, II et al. | 277/53 X |
| 4,934,254 | 6/1990 | Clark et al. | 277/96.2 |
| 4,989,883 | 2/1991 | Orlowski | 277/53 X |
| 5,024,451 | 6/1991 | Borowski | 277/53 |
| 5,040,804 | 8/1991 | Back | 277/53 X |
| 5,069,461 | 12/1991 | Orlowski | 277/53 X |

FOREIGN PATENT DOCUMENTS 0025860 6/1923 France ..................... 277/53

Primary Examiner—William A. Cuchlinski, Jr.
Assistant Examiner—James K. Folker

[57] ABSTRACT

A mechanical labyrinth seal for rotating shafts having a first, second and third ring member. The first ring member has a series of annular axial grooves in the internal bore and a slot extending across the grooves to an end of the first ring. The second ring member is adapted for insertion into an annular recess in the first ring member. The third ring member connected to the second ring member and forming with the first ring member a unitary seal. The second and third ring members rotate with the shaft. The first ring member is fixed to the machine having the shaft to be sealed. The seal permits axial movement of the shaft without separation of the rings.

5 Claims, 2 Drawing Sheets

UNITARY BEARING SEAL

BACKGROUND OF THE INVENTION

It is often important to seal rotating shafts emerging from a bearing and its housing to prevent lubricants associated with the bearings from leaking externally of the housing or bearing and for preventing contaminants in the environment from proceeding through the seal and into the lubricant of the bearings.

Labyrinth seals as described in U.S. Pat. No. 4,706,968, and the prior art cited therein, depend upon forming labyrinths between a plurality of rings where at least one of the rings is stationary and one of the rings rotates with the shaft. These sealing structures are also designed to prevent contaminants from entering the lubricants in the housing.

U.S. Pat. No. 4,706,968 provides a third ring member to improve sealing of the labyrinth interfaces. The third ring also allowed for axial separation of the fixed or stationary ring and the rotating ring while maintaining a seal. This axial separation is the result of axial shaft displacement normally in an outward direction away from the bearing and housing. However, the third ring has not proved as successful as expected in controlling contaminant entrance during the axial shaft movement or axial shaft displacement.

Although the third floating ring solved a great number of problems, problems relating to axial shaft displacement are still encountered in various applications. This invention is designed to eliminate the problems resulting from axial shaft movement or displacement.

SUMMARY OF THE INVENTION

An object of the invention is to provide a seal around rotating shafts and their housing to prevent leakage of lubricants and to prevent the entry of contaminants into the shaft housings, especially during axial shaft movement or displacement, by the use of a third ring which secures the first and second rings into a multi-piece unitary seal.

Two-piece labyrinth mechanical seals depend for their efficiency upon the labyrinths created for the migration of lubricating fluids. One ring of a mechanical labyrinth seal is normally fixed to a shaft and one part of the seal or a second ring is affixed to the housing which is to be sealed. This invention is an improvement over prior art two-piece or three-piece labyrinth mechanical seals. This improvement is provided by attaching the third ring member to the rotating ring member and retaining the rotating ring member in position relative to the fixed ring member as the axial shaft displacement occurs. The invention consists of a mechanical labyrinth seal comprising three parts or rings which become a unitary seal upon assembly.

The first ring is stationary, affixed to the housing and includes an O-ring or other sealing means on its outer periphery allowing it to be fitted to and seal the shaft housing. This first ring is fitted into the shaft housing and maintained in a fixed position by the use of a shoulder or ramp to limit the axial position in the housing. The second ring member has recesses and flanges complimentary, in some cases, to the flanges and recesses on the first ring member. As well-known in the art, these flanges and recesses combinations can be made to provide an effective seal. This seal has also been provided with the insertion of a vent at the bottom of the first ring member so that all foreign matter will be expelled by the rotary motion.

This invention introduces the concept of a third ring member with a smooth exterior surface and with threads to mate with a threaded portion of said second ring member whereby the third ring member rotates with the rotation of said second ring member.

DETAILED DESCRIPTION OF A PREFERRED EMBODIMENT OF THE INVENTION

Figure 1:
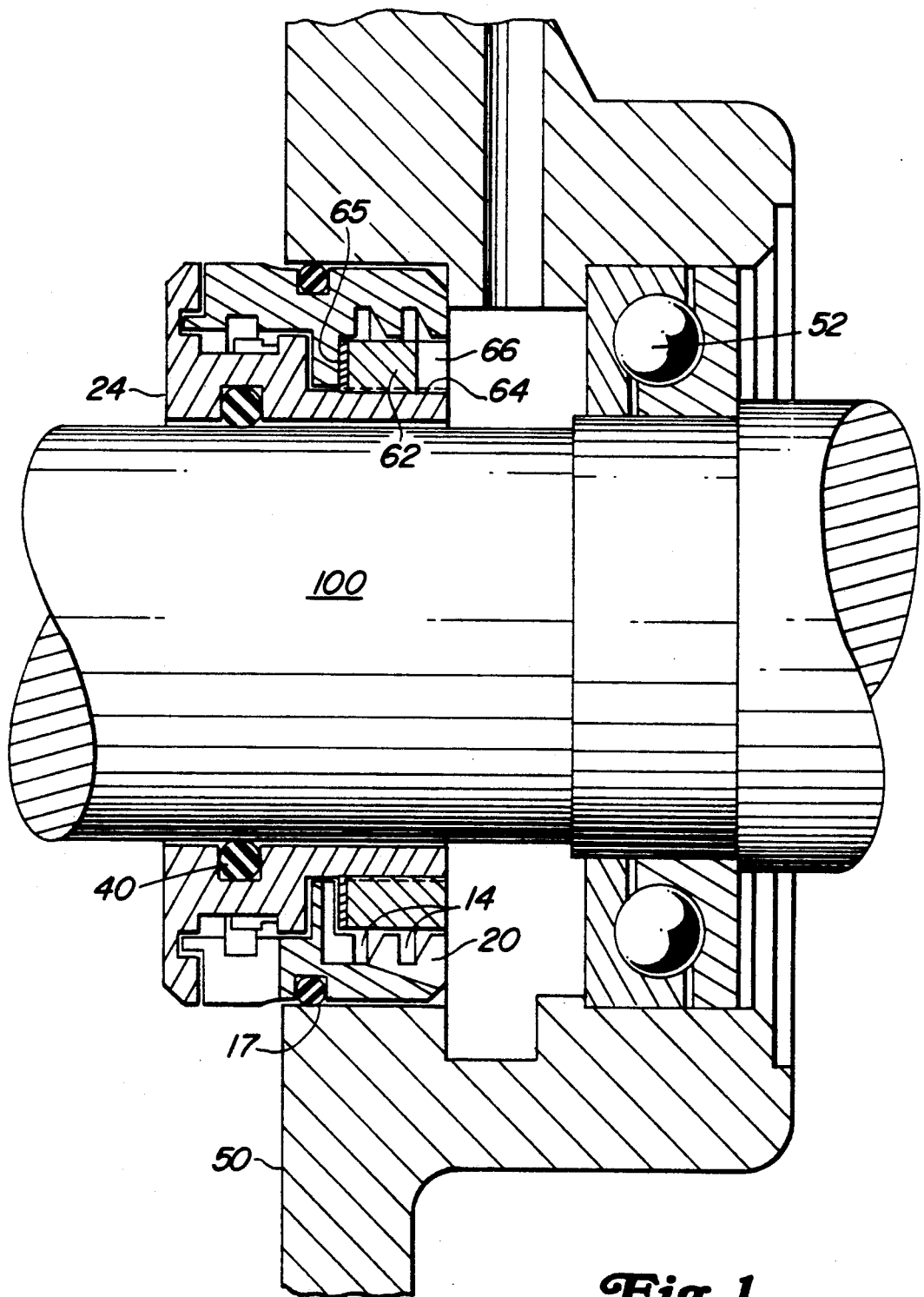
FIG. 1 is a vertical sectional view showing the improved sealing structure with a shaft.
Figure 2:
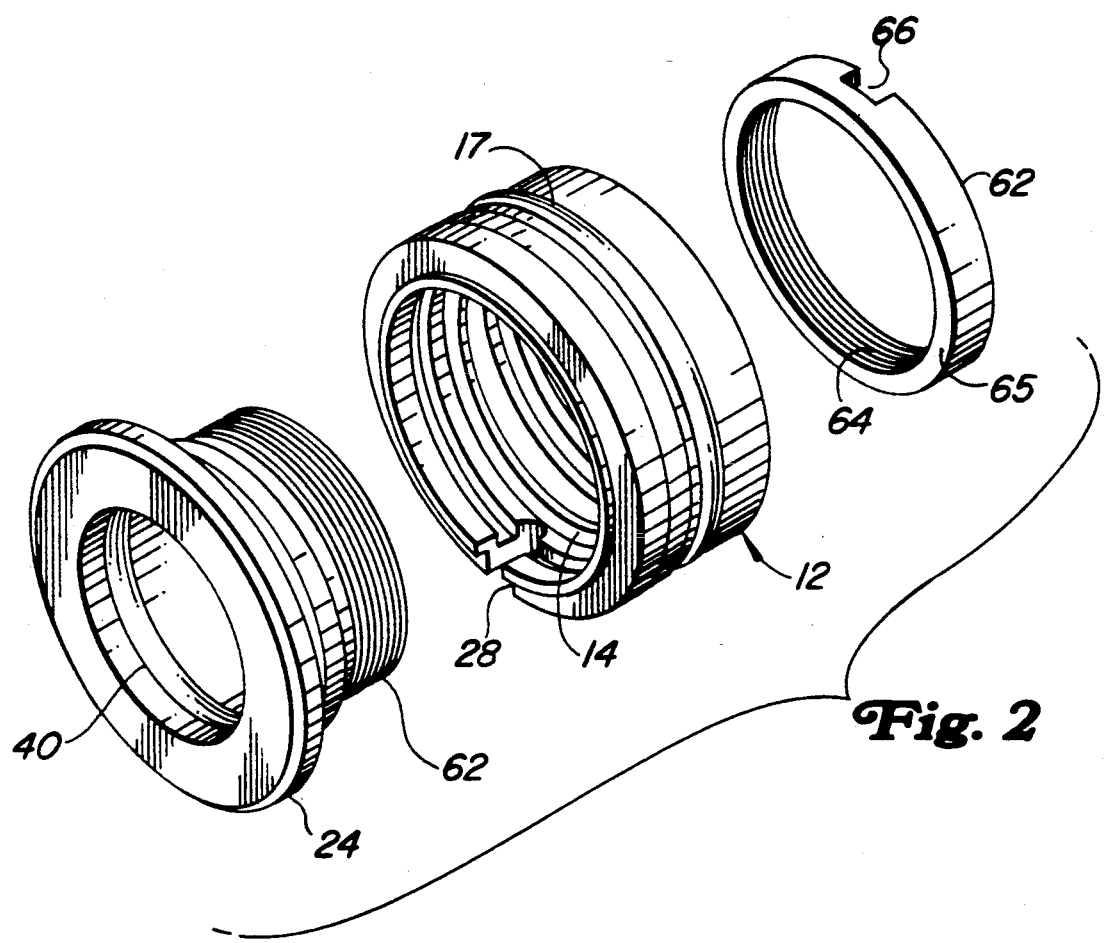
FIG. 2 is an exploded perspective view of the sealing rings of the present invention.

Referring now to FIG. 1, there is shown the sealing structure of the present invention in a typical sealing situation. The sealing rings of the present invention are shown in vertical cross-section mounted on the shaft 100. The shaft 100 extends through the bearing housing 50. Sleeve type bearings or rolling element bearings shown schematically as 52 are conventionally fitted to the shaft 100. Conventional means provide lubricant to the race.

In order to prevent leakage of the lubricant from the housing 50 outwardly and the leakage of foreign material inwardly into the bearing or lubricant, the sealing structure of this invention is provided. This sealing structure includes a first ring (stator) 12 and a mating second ring (rotor) 24. The first ring 12 has internally and externally axially extending faces and an outer axially extending face. The first ring 12 also possesses an external annular groove and O-ring combination 17 which bears against the inner diameter of a complimentary circular opening in housing 50. The first ring 12 may be secured in a well-known manner with respect to the housing, for example, by a wedge fit. The first ring 12 also has a plurality of inwardly extending radial grooves or flanges 14 on its inner surface which will engage lubricants tending to move axially along the shaft and guide the lubricant into the groove 20 on the inside of the first ring 12. The groove 20 leads back into the housing 50 to provide a drain trough. One end of the first ring or stator ring 12 is provided with an annular recess to interface with a mating portion on the second ring 24.

The second ring or rotor ring 24 fits around the shaft 50 and contains conventional O-ring structure 40. The frictional engagement of the O-ring structure 40 between the second ring 24 and the shaft portion 50 causes the second ring 24 to rotate with the shaft 50. The second ring 24 is also provided with a threaded portion 64 which, when assembled, is interior of first ring 12.

A third ring 62 is provided with internal thread 64 to be threaded on the threaded portions 64 of the second 24. The third ring 62 has a smooth exterior surface to mate the annular grooves 14 in the first ring 12. In addition the third ring 62 has a notch 66 which will assist in changing the direction of the lubricant traveling along the shaft and improve the sealing characteristics. The internal face 65 of the third ring 62 may be of metal, however, in order to avoid metal-to-metal contact during the operation of this seal, the face could be coated with some material having natural such as Teflon or nylon. If the face is not coated, a washer O-ring of such material may be placed between the face 65 third ring and its abutting surface on the first ring 12.

In operation, the seal of this invention problems of separation of the rotor ring 24 and the stator 12 due to axial shaft displacement. Sleeve bearing electric motors may experience a shift in the shaft relative to the housing when seeking magnetic center, and under such conditions, the rotor portion of the seals in the prior art have moved with the shaft and may become separated from the stator ring 12 which is in place by the housing. The rings 24, 12 and 62 of this invention form a unitary structure which operates as follows: When the 100 rotates normally, the rotor ring 24 and stator ring 12 being held together as a single unit by the threaded portion 64 will cause the rotor ring 24 and third ring 62 to turn freely without contacting the stator or fixed ring 12. When the shaft 100 moves axially, there is an axial translation of the shaft 100. As a consequence of the axial translation, the third ring 62 is thrust against an abutting surface on the stator ring 12 and the third ring acts as a thrust bearing. Thus, the stator ring 12 and the rotor ring 24 are held firmly in place as a unit by the normal mechanisms holding the stator ring 12 in place and the shaft is allowed to slip in an axial direction past the driving means 40 of the second ring 24. This axial translation of the shaft will not affect the rotation of the seal because of the resiliency of member 40 and its frictional engagement. If need be, there may be more than one O-ring to ensure sufficient frictional engagement for continued rotation while allowing axial translation of the shaft.

There are further advantages obtained by rotating the third ring 62 within the confines of the first ring 12. The labyrinth grooves in the fixed ring 12 or stator are outside the smooth exterior surface of the third ring 62. This moves the labyrinth path for the lubricant radially off the shaft surface which inhibits lubricant flow along the shaft. The specific velocity of the third ring is greater at that point than on the shaft and the lubricant will thus have to navigate additional 90 turns to escape the housing. The rotating face of the third ring 62 including the recess 66 changes the direction of the lubricant travelling along the shaft toward possible escape to a direction perpendicular to the shaft, thus, improving the retention and sealing characteristics of this unitary seal.

Variations in other aspects of the preferred embodiment will occur to those versed in the art, all without departure from the spirit and scope of the invention.

What is claimed is:

1. A ring seal between a fixed housing and a rotating shaft comprising:
   a first ring member having a first end portion located internally of the fixed housing and a second end extending externally of said housing and an outer surface being fixed and sealed to said housing by a shoulder means;
   said first ring having a plurality of annular recesses and flanges on both the first and second end portions and a mating face;
   a second ring member including means to rotate said second ring member with said shaft;
   said second ring member having annular flanges extending axially with inner and outer radial surfaces complimentary with certain of said flanges and recesses of said first ring when inserted in said first ring;
   said second ring including an axial threaded portion located radially inside said first ring;
   a third ring having a mating face and an internally threaded portion located radially inside said first ring and connected with said threaded portion of said second ring.

2. The seal of claim 1 wherein the an outer axially extending surface of said third ring is smooth, said axially extending surface of said third ring mating with the recesses of said first ring to retain lubricant.

3. The seal of claim 2 wherein said means for rotating said second member with said shaft permits axial movement of said shaft with relation to said second ring with continuing rotation of said second ring.

4. The seal of claim 3 wherein the mating faces of said first and said third rings prevent axial movement of said second and said third rings as said shaft moves axially with relation to said rings and said second and third rings continue to rotate.

5. The seal of claim 4 wherein the mating faces of said first and said third rings are made of materials having natural lubricity.

* * * * *